United States Patent [19]

Chang et al.

[11] Patent Number: 5,034,906
[45] Date of Patent: Jul. 23, 1991

[54] PSEUDORANDOM BINARY SEQUENCE DELAY SYSTEMS

[75] Inventors: Paul T. Chang, Westford, Mass.; Stephen C. Connell, Derry, N.H.; Donald M. Sibley, Hudson, Mass.

[73] Assignee: Microwave Logic, Tyngsboro, Mass.

[21] Appl. No.: 501,558

[22] Filed: Mar. 30, 1990

[51] Int. Cl.⁵ .............................................. G06F 1/02
[52] U.S. Cl. .................................................. 364/717
[58] Field of Search .................... 364/717; 371/27; 331/78

[56] References Cited

U.S. PATENT DOCUMENTS 4,341,925 7/1982 Doland .......................... 364/717 X
4,719,643 1/1988 Beeman .......................... 364/717 X
4,816,834 3/1989 Bjorke ................................ 342/120

Primary Examiner—Gary V. Harkcom
Assistant Examiner—Tan V. Mai
Attorney, Agent, or Firm—William D. Roberson

[57] ABSTRACT

Systems for synchronizing a pseudorandom binary sequence signal with a time-delayed version of the same signal without the use of delay lines or programmable counters. This is accomplished by the use of two Pseudorandom Binary Sequence [PRBS] generators for producing the same PRBS signal. Each PRBS generator incorporates as a constituent component a serial shift register with M stages with the outputs of multiple stages fed back through an exclusive-OR to provide an input to the register, thereby to produce a clocked repetitive series of said sequence signal as inputs to each register. The states of shift register are numbered n such that (n−1) clock cycles elapse before the next start state. A start detect circuit is responsive to the start state of the pseudorandom binary sequence signal of the first generator for generating a synchronizing signal at that instant to force the second PRBS generator to be at a state in the binary sequence representing a delayed point in the sequence.

10 Claims, 4 Drawing Sheets

| n | Q1 | Q2 | Q3 | Q4 | PBRS |
|---|----|----|----|----|------|
| 1 | 1 | 1 | 1 | 1 | 1 |
| 15 | 0 | 1 | 1 | 1 | 1 |
| 14 | 1 | 0 | 1 | 1 | 1 |
| 13 | 0 | 1 | 0 | 1 | 1 |
| 12 | 1 | 0 | 1 | 0 | 0 |
| 11 | 1 | 1 | 0 | 1 | 1 |
| 10 | 0 | 1 | 1 | 0 | 0 |
| 9 | 0 | 0 | 1 | 1 | 1 |
| 8 | 1 | 0 | 0 | 1 | 1 |
| 7 | 0 | 1 | 0 | 0 | 0 |
| 6 | 0 | 0 | 1 | 0 | 0 |
| 5 | 0 | 0 | 0 | 1 | 1 |
| 4 | 1 | 0 | 0 | 0 | 0 |
| 3 | 1 | 1 | 0 | 0 | 0 |
| 2 | 1 | 1 | 1 | 0 | 0 |
| 1 | 1 | 1 | 1 | 1 | 1 |

PSEUDORANDOM BINARY SEQUENCE DELAY SYSTEMS

This invention relates to signal synchronizing systems and particularly to systems for synchronizing a coded or pseudorandom signal with a time-delayed version of the same signal to determine the amount by which the original signal is delayed between the time of its transmission and its subsequent detection.

BACKGROUND OF THE INVENTION

The process of determining distances is called ranging. Examples of signal ranging systems are not only RADAR and SONAR, but also telecommunications systems. One technique used in both of these types of ranging systems is to transmit a Pseudorandom Binary Sequence signal, hereinafter termed a PRBS signal and to measure the delay in the return time of the echo. When the echo returns, the delay time $t_d$ of the echo is determined by identifying the corresponding start time of the echo pattern by comparing the echo signal with a duplicate of the original signal. When the delay of the duplicate signal is adjusted by a known increment of time so that the duplicate signal matches that of the echo waveform, the delay $t_d$ is determined. This invention concerns a novel system for producing an accurately timed sequence of matched Pseudorandom Binary Sequence [PRBS] signals.

INTRODUCTION TO THE DRAWINGS

PRIOR ART

Figure 1:
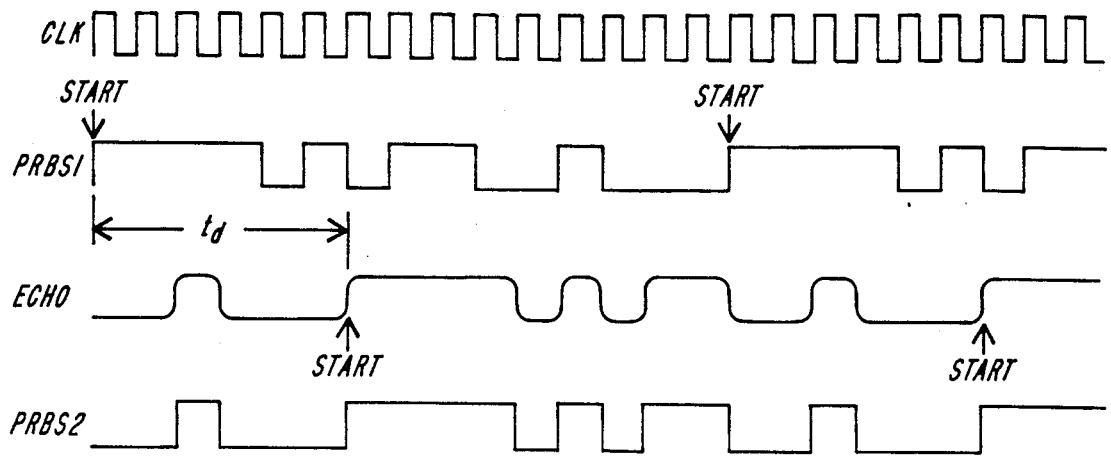
FIG. 1 is a graphical representation of signal waveforms useful in describing the principles of this invention as well as those of the prior art.

FIG. 1 is a graphical representation of an illustrative set of signals occurring in a ranging system. A clock signal CLK is used in timing and counting operations in the system. The signal identified as PRBS1 in FIG. 1 is typical in such systems; it is a repetitive pattern with the beginning of the sequence marked here by "Start". The length N of a PRBS signal "word" is defined as the number of clock signals between successive Starts. The returning echo of the original PRBS1 signal is labeled ECHO. The signal identified as PRBS2 is a duplicate time-delayed version of PRBS1. This is achieved by delaying PRBS1 to produce PRBS2. To produce a match between the PRBS2 signal and the ECHO signal it is necessary to delay the "start" of the former by the difference in time $t_d$ between the transmission of PRBS1 and the return of its ECHO.

Figure 2:
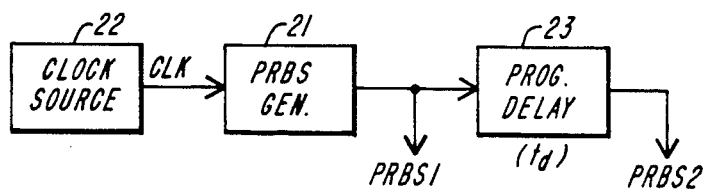
FIG. 2 is a diagrammatic representation of one type of prior art system for timing the sequential release of coded PRBS signals.

One common prior art system for producing a time-delayed sequence of PRBS signals is shown in FIG. 2, where the PRBS1 signal is produced by a Pseudorandom Binary Sequence generator 21 (PRBS generator) controlled by a clock source 22. A transmission line 23 delays this signal by a variable, and programmable amount to produce the PRBS2 signal. The transmission line is usually a coaxial cable or a fiber-optic cable, which has a delay of 5 $\mu$s/m, but the delay function can also be provided by a shift register. The PRBS1 signal may be directed to a transmitter, not shown, and the PRBS2 signal to a receiver, also not shown, where an analysis may be performed on the returning ECHO signal.

There are several practical problems with a system of the type shown in FIG. 2. Since delays on the order of 10 $\mu$s are typically required, the delay line 23 is bulky, i.e. because the physical length of the delay line may be on the other 2 kilometers. The restricted bandwidth of a delay line causes jitter in the PRBS2 signal. Attempts to increase the bandwidth can be costly in applications requiring high bandwidths. The required bandwidth may be as high as 500 MHz. The programmable feature of the delay line requires many switches, which are bulky and expensive, especially in the case of a fiber-optic delay line. A digital shift register is also bulky, generally requiring thousands of stages, each with an accessible tap.

Figure 3:
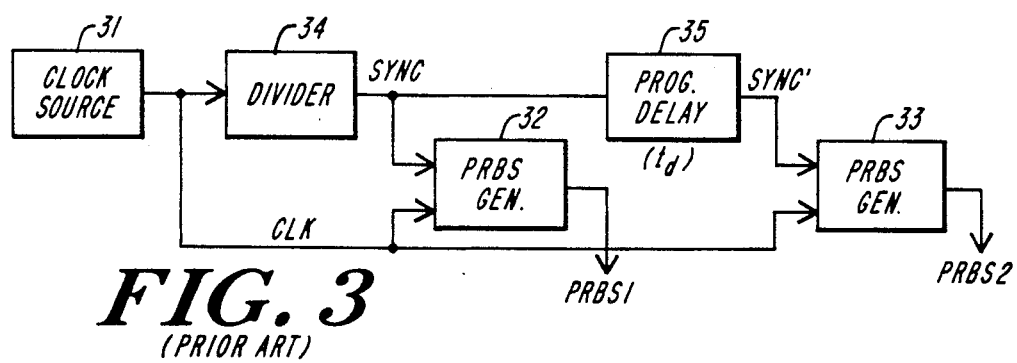
FIG. 3 is a diagrammatic representation of another type of prior art system for timing the sequential release of coded PRBS signals.

A second prior art method for timing the sequential release of coded PRBS signals is shown in FIG. 3. A clock source 31 provides a CLK signal to a first PRBS generator 32 and a second PRBS generator 33. Both generators produce identical PRBS output signals, but at different start times. The clock source 31 also provides a SYNC signal through a frequency divider 34 to generator 32 and a programmable delay device 35. The latter produces a SYNC' pulse to the second PRBS generator 33 time-delayed by $t_d$, thereby synchronizing the "start" of the PRBS2 signal with the returning ECHO of the PRBS1 signal. The SYNC pulse is derived from the CLK signal by dividing the clock frequency by N, where N is the length of the PRBS signal. The SYNC signal forces the first PRBS Generator 32 to be at the Start point in its sequence when the SYNC pulse occurs.

The delay device 35 of FIG. 3 is typically either a delay line or a programmable counter. The signal to be delayed in this case, however, is a regular pulse train rather than a complex PRBS signal. The delayed signal SYNC' forces PRBS Generator 33, a circuit identical to PRBS Generator 32, to be at the Start point in its sequence when the SYNC' pulse occurs. Thus PRBS2 is a delayed version of PRBS1, where the delay is $t_d$. The two PRBS signals may be used for ranging purposes, as indicated in connection with the prior art embodiment of FIG. 2. One example of such a system using two PRBS generators is shown in U.S. Pat. No. 4,816,834 issued to Bjorka on Mar. 28, 1989.

This second prior art type of system represented in FIG. 3 has its own problems when used in high-frequency applications, even in those whose frequencies are as low as 50 MHz. The relative advantage of using a programmable counter for the delay device 35 is mitigated by the complexity of a high-frequency programmable counter. Necessary prescalers and controllers make the circuitry cumbersome.

BRIEF SUMMARY OF AN EMBODIMENT OF THE INVENTION

The present invention involves systems for synchronizing a coded Pseudorandom Binary Sequence signal with a time-delayed version of the same signal without the use of delay lines or programmable counters. This may be accomplished by the use of two PRBS generators for producing the same PRBS signal. Each PRBS generator incorporates as a constituent component a serial shift register with M stages with the outputs of multiple stages fed back through an exclusive-OR to provide an input to the register, thereby to produce a clocked repetitive series of the sequence signal as inputs to the register, the states of the shift register being numbered n, such that (n−1) clock cycles elapse before the next Start state. Preferably a Start detect circuit is responsive to the initiation of the Pseudorandom Binary Sequence signal from the first generator for generating a pulsed start signal S at that instant, the delay between the Start states of the two PRBS generators being:

$$t_d = nt_c$$

where $t_c$ is the duration of a clock cycle. After N states the generator returns to the Start state, and the pattern of the Pseudorandom Binary Sequence signal sequences repeats.

DETAILED DESCRIPTION OF THE INVENTION

Figure 4:
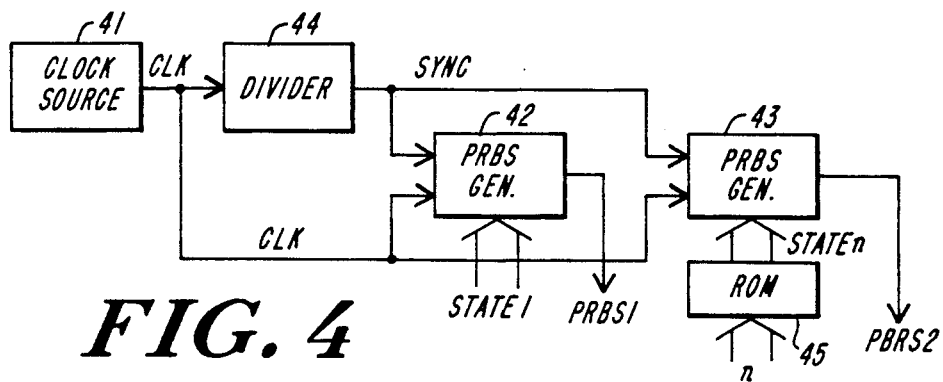
FIG. 4 is a diagrammatic representation of a system constructed in accordance with the principles of this invention for accurately timing the sequential release of PRBS signals without the use of delay lines or complicated switching arrangements.
Figure 5:
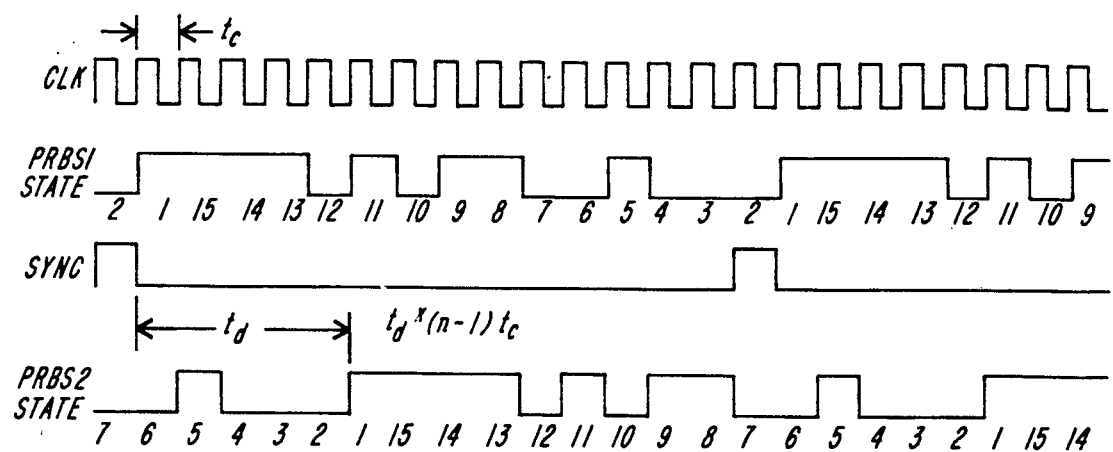
FIG. 5 is a graphical representation of signal waveforms produced in the system of FIG. 4.

The system illustrated in FIG. 4, which should be read in connection with the representative signal waveforms of FIG. 5, is an embodiment of this invention which improves on prior methods and systems by requiring no delay lines or programmable counters. Clock source 41 sends timing CLK signals to PRBS generators 42 and 43 as well as to a frequency divider 44. The latter sends the same SYNC signal to both PRBS Generators 42 and 43. In this case the SYNC pulse doesn't necessarily force either PRBS Generator to the Start state; it forces them to states specified by a bus input to the generator.

The usual operation of the PRBS generator is that the SYNC pulse is present on the load input for setup time $t_c$ before the rising edge of the clock signal CLK. Upon the rising edge, the state n is loaded into the PRBS generator. The SYNC pulse ends immediately after that rising edge of the clock signal CLK so that another load does not occur.

In FIG. 4, PRBS Generator 42 is shown set to State 1, and PRBS Generator 43 is set to some programmable State n by the SYNC pulse. It will be shown below that each point in the PRBS signal corresponds to a different state. Let the states be numbered so that the difference between the state numbers is equal to the number of clock cycles separating them. Then the delay between PRBS1 and PRBS2 is:

$$t_d = (n-1)t_c$$

where $t_c$ is the time for one clock cycle. It is preferred to generate State n from the number n by using a look-up table or read-only memory 45 (ROM). The binary number n is applied to the address bus of the ROM 45 and the bits corresponding to State n appear on the data bus. These are the bits loaded by the SYNC pulse to the PRBS generator 43.

The timing waveforms in FIG. 5 illustrate a representative sequence for the signals in the embodiment of FIG. 4. In this illustrative example n=6, so State 6 is loaded into PRBS Generator 43. This occurs on the falling edge of the SYNC pulse. Therefore the PRBS2 signal pattern is five clock cycles delayed relative to the PRBS1 signal pattern. The desired delay in this system has been achieved by loading states into the PRBS Generators, not by using delay lines or programmable counters.

Figure 6:
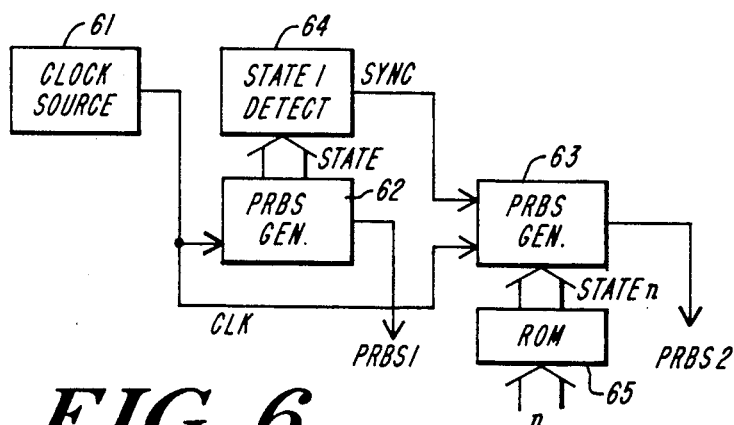
FIG. 6 is a diagrammatic representation of a second and preferred system constructed in accordance with the principles of this invention for accurately timing the sequential release of PRBS signals.
Figure 7:
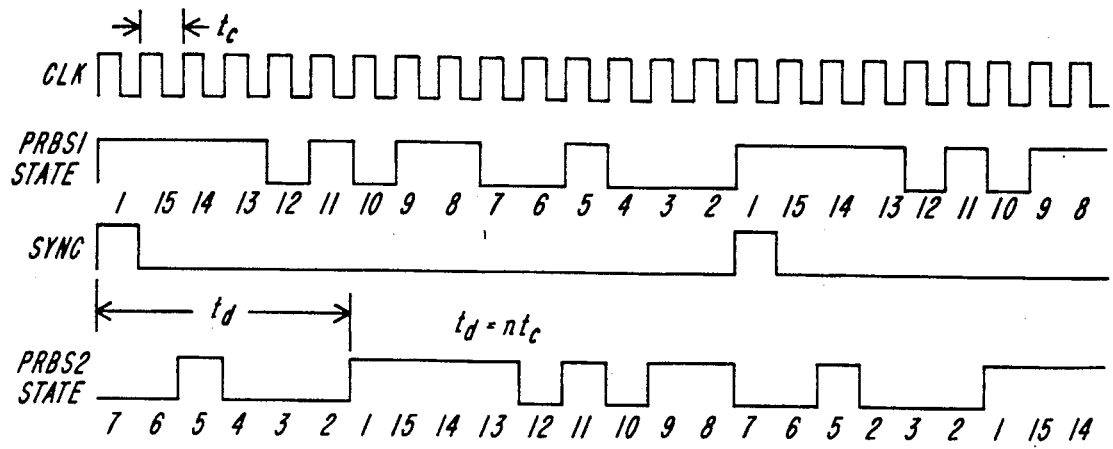
FIG. 7 is a graphical representation of signal waveforms produced in the system of FIG. 6.

An alternate and preferred embodiment of this invention is shown in FIG. 6, which should be read in connection with FIG. 7, which shows the relative timing of the signal waveforms. The FIG. 6 configuration differs from that of FIG. 4 in that the SYNC signal is generated by a State Detector 64 rather than by an N frequency divider. Here the State 1 Detector 64 monitors the state of the first PRBS Generator 62 and produces a SYNC pulse when State 1 occurs. On the falling edge of the pulse, State n is loaded into PRBS Generator 63. In the example here State 6 is thus loaded into the second PRBS Generator 63 from ROM 65. This puts the PRBS2 signal six clock cycles behind the PRBS1 signal. There is a delay of $t_d = 6t_c$, where $t_c$ is the time for one clock cycle. In general, $t_d = nt_c$, where n is the number of the state loaded into PRBS Generator 2. The embodiment of FIG. 6 is currently preferred over that of FIG. 4, because the combinational logic required for a State Detector 64 is typically simpler than the sequential logic required for an N frequency divider.

Figures 8, 9:
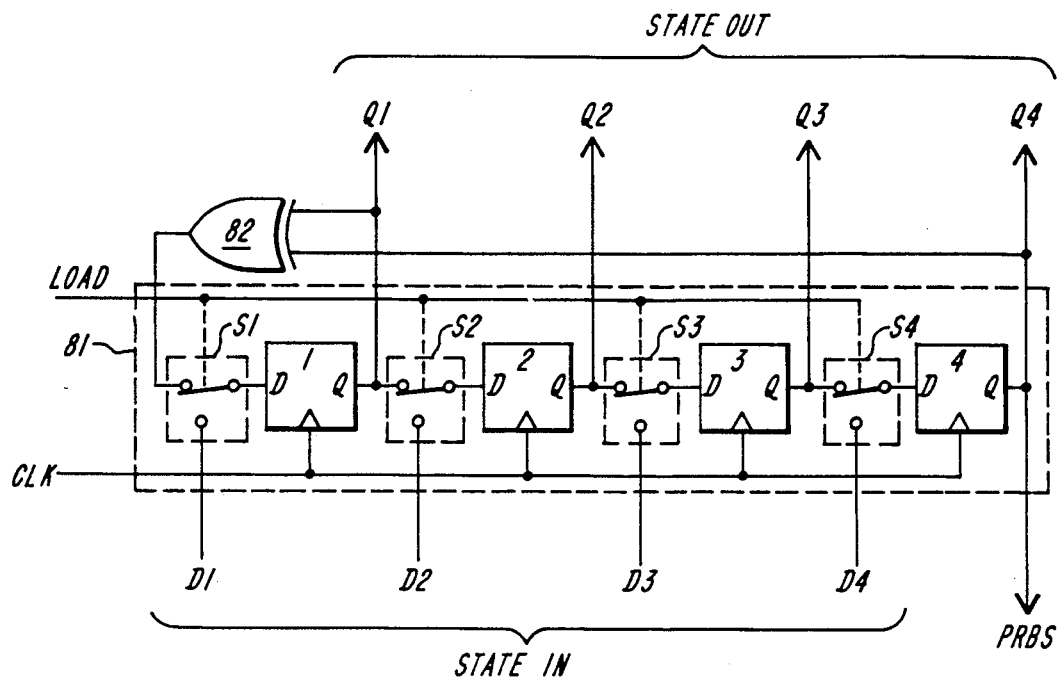
FIG. 8 represents the functional inner structure of a PRBS generator such as those represented in FIGS. 4 and 5.
FIG. 9 is a graphical chart for use in describing the generation of PRBS signals by the PRBS generator of FIG. 8.

FIG. 8 shows a typical form of a PRBS generator, not itself the subject of this invention, which may be used in systems assembled in accordance with this invention. The PRBS generator is shown to comprise a serial shift register 81 which has the outputs of two or more of its stages 1, 2, 3, and 4 fed back through an exclusive-or gate 82 to provide the input to the register. The representative example shown here in simplified form comprises only a four-stage register to produce the 15-bit sequence shown as PRBS1 in FIG. 7. In practice the register in the PRBS generator is longer-typically 7 to 23 stages. The four-stage register chosen here provides a usefully simplified example of the principles of the invention. Corresponding to each position in the output sequence of the shift register 81 is a unique state of the register defined by the outputs Q1, Q2, Q3 and Q4 of the four stages.

The sequence of these states is represented in FIG. 9. Let State 1 be the state 1111 corresponding to a 1 in the PRBS sequence. The next state in the sequence is 0111 corresponding to another 1 in the PRBS signal. Note that the last bit of the state, the Q4 output, is the corresponding bit of the PRBS signal. After 15 states the PRBS generator returns to state 1111, and the pattern repeats. The "State 1 Detect" unit in FIG. 6 detects the state 1111 and produces a pulsed SYNC signal.

It is possible to set the shift register to some desired state at any time by applying a pulse to the Load input shown in FIG. 8. This causes the switches S1, S2, S3, and S4 (actually solid state switches) at the input to each stage to connect respectively to the D1, D2, D3, and D4 inputs rather than to the output of the previous stage. After the state on D1, D2, D3, and D4 has been clocked into the register, the SYNC pulse is removed from the Load input line, and the switches return to the serial shift register mode. An alternative is to load the n state serially by actuating only the first switch and entering the bits serially by way of D1.

Let the PRBS generator states listed in FIG. 9 be numbered 1 through 15 so that State n occurs n−1 clock cycles before the state 1111 labeled State 1. For example, State 7 is 0100, which occurs six states before the state 1111. Therefore if the PRBS Generator 63 in FIG. 6 is at State 7 when PRBS Generator 62 is at State 1, then the PRBS2 signal is delayed six clock cycles behind the PRBS1 signal. (See FIG. 7.)

Thus each of the PRBS generators 62 and 63 in FIG. 6 comprise a serial shift register with M stages, with the outputs of multiple stages fed back through an exclusive-OR to provide an input to the register, thereby to produce a clocked repetitive series of the PRBS signal as inputs to the register. The states of each shift register being numbered n, it follows that (n−1) clock cycles elapse before the next State 1. The State 1 Detector 64 is responsive to the Start of the said Pseudorandom Binary Sequence signal from the first generator 62 to generate a pulsed start signal SYNC at that instant. After N states the generator returns to the Start state, and the pattern of the PRBS signal repeats. The synchronizing pulse signal SYNC causes State n to be loaded into the second PRBS generator 63. If the loading were simultaneous with the S pulse, PRBS2 would be (n−1) clock cycles behind PRBS1. But since the loading occurs one clock cycle after the S pulse, the result is that PRBS2 occurs (n−1)+1 clock cycles behind PRBS1. Then the delay of PRBS2 relative to PRBS1 is $t_d = nt_c$, where $t_c$ is the duration of a clock cycle. For convenience a read-only memory (ROM) 65 is used as a look-up table to provide State n to the second PRBS generator 63 when the number n is applied to the address bus of the ROM 65.

Because n is changed relatively infrequently, the speed requirements on the ROM are moderate. Thus the invention achieves the desired delay of the second PRBS signal without using a delay line or programmable counter that must handle high frequency signals. On the one hand a broad-band delay line is bulky and expensive; whereas a narrow-band delay line introduces jitter into the delayed signal. On the other hand a high frequency programmable counter requires many components and is cumbersome and expensive. By contrast, the ROM circuit preferably used in the practice of this invention is small, inexpensive, and readily available. It can also operate at a low frequency.

Having thus described examples of the invention illustrating the principles on which it is based, as well as advantages resulting therefrom, we wish to make clear that these examples are not to be misconstrued as limiting the scope of the invention in its broader aspects. What we claim as new and desire to protect is defined in the following claims.

We claim:

1. A system for producing time-delayed sequences of a pseudorandom binary sequence (PRBS) signal comprising:
    a first pseudorandom bit sequence generator for producing a first PRBS signal;
    a second pseudorandom bit sequence generator for producing a second PRBS signal which is a duplicate of said first PRBS signal;
    means for applying cyclic clock signals to each of said generators for clocking their PRBS signals;
    means for applying a synchronizing signal to said second generator at the start of the first PRBS signal, said second generator being responsive to the synchronizing signal to assume a state corresponding to a point in the PRBS signal offset in sequence from the PRBS signal of the first generator;
    programmable means for determining the state which said second generator assumes upon application to said second generator of said synchronizing signal to commence the sequence of the second PRBS signal at an offset point in the sequence of such pseudorandom binary sequence signal;
    whereby said first and second PRBS signals are sequentially synchronized without the use of a delay line or mechanical switching.

2. The system of claim 1 further comprising:
    means connecting said first generator to receive said synchronizing signal; and
    wherein said first generator is caused by said synchronizing signal to commence said first PRBS signal at the start of its sequence and wherein said programmable means is responsive to said synchronizing signal to cause said second generator commence said second PRBS signal at a programmable point in its sequence.

3. The system of claim 1 wherein said programmable means determines the point in the sequence of said second PRBS signal at which the sequence of said second PRBS signal commences.

4. The system of claim 1 wherein said programmable means comprises a Read Only Memory (ROM).

5. A system for producing time-delayed sequences of a pseudorandom binary sequence (PRBS) signal comprising:
    a first pseudorandom bit sequence generator for producing a first PRBS signal;
    a second pseudorandom bit sequence generator for producing a second PRBS signal which is a duplicate of said first PRBS signal;
    each of said generators being timed from a single clock source and each of said generators comprising a serial shift register with M stages having the outputs of multiple stages fed back through an exclusive-OR to provide an input to the register, thereby to produce a clocked repetitive series of said pseudorandom binary sequence signal as inputs to said register, the states of each shift register being numbered n such that (n−1) clock cycles elapse before the next start state;
    means for signaling to said first pseudorandom bit sequence generator to load the start state of said first PRBS signal; and
    programmable means for determining the state which said second generator assumes simultaneously with the start state of said first PRBS signal to load a different programmed state of said second PRBS signal representing an offset point in the sequence of said pseudorandom binary sequence signal,
    whereby the programming of the delay between said PRBS signals is achieved by logic rather than by delay line or physical switches.

6. The system of claim 5 further comprising:

a source of a synchronizing signal connected to each of said generators; and wherein said signaling means and said programmable means respond to said synchronizing signal to load the start state of the first PRBS signal and the programmed state of said second PRBS signal.

7. The system of claim 6 wherein the offset point in the sequence of said second PRBS signal relative to said first PRBS signal is:

$$t_d = (n-1)t_c$$

where $t_c$ is the duration of a clock cycle, and n is the number of clock cycles selected by said programmable means.

8. The system of claim 5 further comprising:

synchronizing means for sending a synchronizing signal to the second PRBS generator in response to the start sequence of said first PRBS generator;

and wherein said programmable means responds to said synchronizing signal to load the programmed state of said second PRBS signal.

9. The system of claim 8 wherein the offset point in the sequence of said second PRBS signal relative to said first PRBS signal is:

$$t_d = nt_c$$

where $t_c$ is the duration of a clock cycle, and n is the number of clock cycles selected by said programmable means.

10. The system of claim 5 wherein said programmable means comprises a Read Only Memory (ROM).

* * * * *